US012498569B2

(12) United States Patent
Tao

(10) Patent No.: US 12,498,569 B2
(45) Date of Patent: Dec. 16, 2025

(54) HEAD-MOUNTED DISPLAY, POSE TRACKING SYSTEM, AND METHOD

(71) Applicant: HTC Corporation, Taoyuan (TW)

(72) Inventor: Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/410,999

(22) Filed: Jan. 11, 2024

(65) Prior Publication Data
US 2025/0231404 A1 Jul. 17, 2025

(51) Int. Cl.
G02B 27/01 (2006.01)
G06V 40/10 (2022.01)

(52) U.S. Cl.
CPC ............ G02B 27/017 (2013.01); G06V 40/11 (2022.01)

(58) Field of Classification Search
CPC ............ G02B 27/017; G02B 27/0179; G02B 27/0189; G02B 27/0192; G06V 40/11
See application file for complete search history.

(56) References Cited

U.S. PATENT DOCUMENTS

| 11,507,203 B1 * | 11/2022 | Bosworth | ............... G06T 13/40 |
| 2017/0308166 A1 | 10/2017 | Mallinson | |
| 2019/0212359 A1 * | 7/2019 | Erivantcev | ............. G06F 1/163 |
| 2019/0318501 A1 | 10/2019 | Balan et al. | |
| 2023/0161415 A1 | 5/2023 | Yang et al. | |

FOREIGN PATENT DOCUMENTS

| CN | 110554769 A | 12/2019 |
| CN | 115097943 A | 9/2022 |
| CN | 110612506 B | 11/2022 |
| TW | 202228823 A | 8/2022 |

OTHER PUBLICATIONS

The search report of the corresponding European application No. EP 24172288.3 issued on Oct. 21, 2024.
The office action of the corresponding Taiwanese application No. TW113126671 issued on Feb. 4, 2025.

* cited by examiner

*Primary Examiner* — Lisa S Landis
(74) *Attorney, Agent, or Firm* — CKC & Partners Co., LLC

(57) ABSTRACT

A head-mounted display, pose tracking system, and method are provided. The head-mounted display generates a plurality of first real-time images including a user holding a self-tracking device in a physical space. The head-mounted display receives first self-tracking pose information from the self-tracking device. The head-mounted display generates a hand pose information based on the first real-time images, and the hand pose information is a six-degree-of-freedom information. The head mounted display calculates drift information of the hand pose information and the first self-tracking pose information. The head mounted display calibrates the first self-tracking pose information based on the drift information.

18 Claims, 4 Drawing Sheets

HEAD-MOUNTED DISPLAY, POSE TRACKING SYSTEM, AND METHOD

BACKGROUND

Field of Invention

The present invention relates to a head-mounted display, pose tracking system, and method. More particularly, the present disclosure relates to a head-mounted display, pose tracking system, and method for calibrating the self-tracking pose.

Description of Related Art

In recent years, various technologies related to virtual reality have developed rapidly, and various technologies and applications have been proposed one after another. In the prior art, the head-mounted display and the self-tracking device in the environment can perform various interactive operations through map systems generated based on simultaneous localization and mapping operations.

However, the self-tracking device may gradually accumulate error values over a period of time, and these error values may lead to a reduction in the accuracy of the interactive operation. Therefore, if there is no drift calibration for the coordinate system of the self-tracking device, the auxiliary data generated by the self-tracking device may not be correctly provided to the head-mounted display for use, which may reduce the user's service experience.

In addition, when environmental or human factors cause the auxiliary data of the self-tracking device to be unable to provide complete six-degree-of-freedom information, the head-mounted display may temporarily be unable to display the position and pose of the self-tracking device on the display, resulting in a bad experience for users.

For example, when the object tracked by computer vision is blocked and cannot be tracked or the self-tracking device needs to perform a relocation operation, the self-tracking device may enter a mode that can only generate three-degree-of-freedom information. (i.e., the information generated by the self-tracking device only has rotational values generated by the inertial inertia sensor and does not have translational values).

Accordingly, there is an urgent need for a pose tracking technology that can calibrate the self-tracking pose.

SUMMARY

An objective of the present disclosure is to provide a head-mounted display. The head-mounted display comprises a display, a first image capturing device, and a processor, and the processor is electrically connected to the display and the first image capturing device. The first image capturing device is configured to generate a plurality of first real-time images including a user holding a self-tracking device in a physical space. The processor receives a first self-tracking pose information from the self-tracking device. The processor generates a hand pose information based on the first real-time images, and the hand pose information is a six-degree-of-freedom information. The processor calculates a drift information of the hand pose information and the first self-tracking pose information. The processor calibrates the first self-tracking pose information based on the drift information.

Another objective of the present disclosure is to provide a pose tracking system, the pose tracking system comprises a self-tracking device and a head-mounted display. The head-mounted display is communicatively connected to the self-tracking device, and the head-mounted display is configured to generate a plurality of first real-time images including a user holding the self-tracking device in a physical space. The head-mounted display receives a first self-tracking pose information from the self-tracking device. The head-mounted display generates a hand pose information based on the first real-time images, and the hand pose information is a six-degree-of-freedom information. The head-mounted display calculates a drift information of the hand pose information and the first self-tracking pose information. The head-mounted display calibrates the first self-tracking pose information based on the drift information.

Another objective of the present disclosure is to provide a pose tracking method, which is adapted for use in an electronic apparatus. The electronic apparatus is configured to generate a plurality of first real-time images including a user holding a self-tracking device in a physical space. The pose tracking method comprises the following steps: receiving a first self-tracking pose information from the self-tracking device; generating a hand pose information based on the first real-time images, wherein the hand pose information is a six-degree-of-freedom information; calculating a drift information of the hand pose information and the first self-tracking pose information; and calibrating the first self-tracking pose information based on the drift information.

According to the above descriptions, the pose tracking technology provided by the present disclosure (including at least head-mounted displays, systems and methods) calibrates the self-tracking pose information generated by the self-tracking device by calculating the drift information of the hand pose information and the self-tracking pose information to improve the accuracy of interaction between devices. In addition, the pose tracking technology provided by the present disclosure can actively generate new self-tracking pose information based on hand pose information and self-tracking pose information when the self-tracking pose information generated by the self-tracking device is incomplete (e.g., the computer vision image of the self-tracking device is blocked, and the self-tracking pose information is only the three-degree-of-freedom information), so as to improve the user's service experience. In addition, the pose tracking technology provided by the present disclosure can also generate the fusion pose information through the self-tracking pose information and the hand pose information and display it on the display before the self-tracking device completes the relocation operation, thereby improving the user's service experience.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a head-mounted display, pose tracking system, and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

The applicable scenario of the present embodiment will be described first. In the application environment of the present disclosure, the user uses the head-mounted display in a physical space, and the user holds a self-tracking device (e.g., a controller with a self-tracking function) to perform control and interactive operations with the head-mounted display and the self-tracking device.

It shall be appreciated that this disclosure does not limit the number of self-tracking devices used by the user, and those of ordinary skilled in the art should be able to understand the implementations when the user uses a plurality of self-tracking devices based on the descriptions of the present disclosure, so no further description will be made herein.

Figure 1:
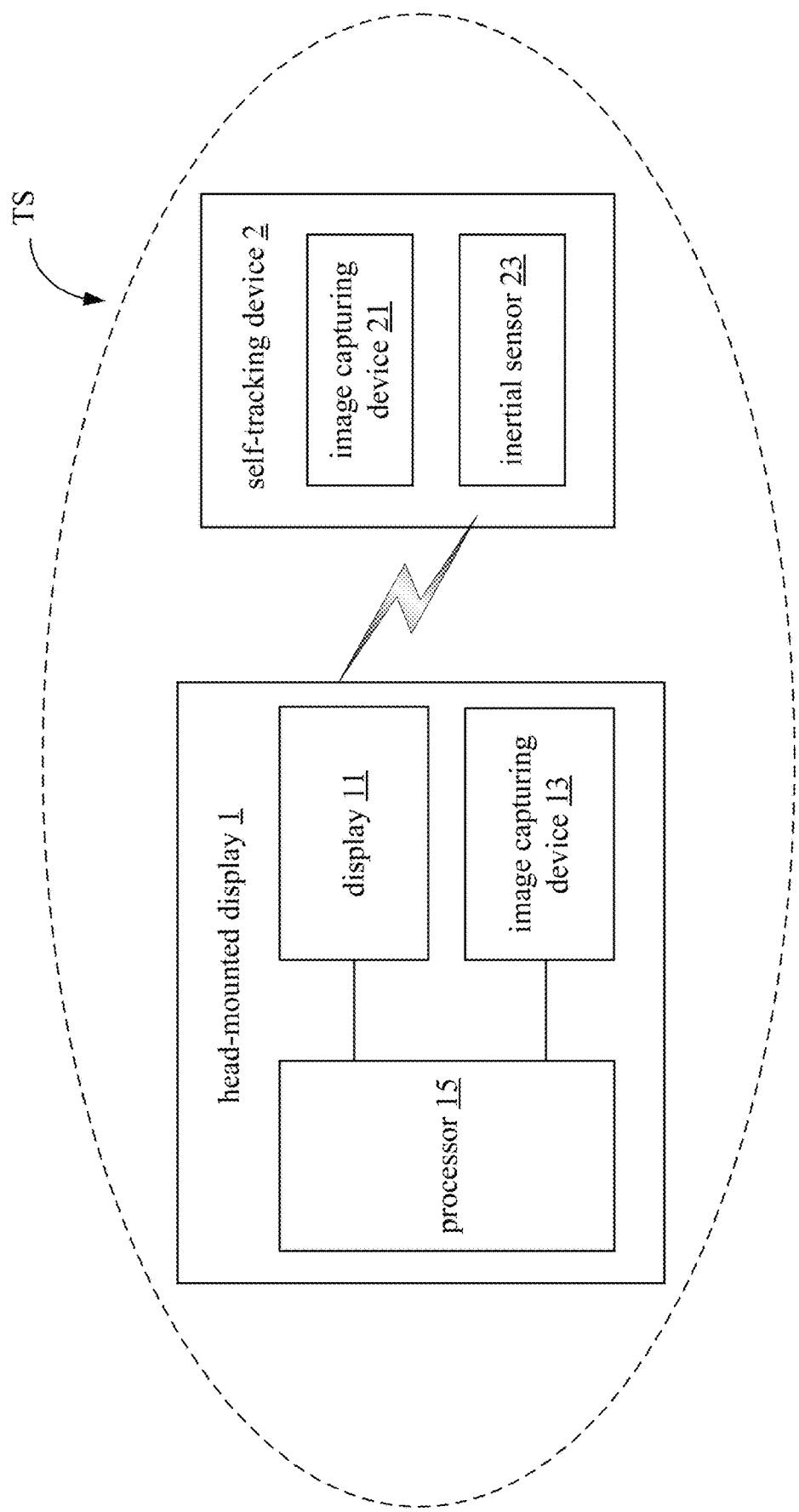
FIG. 1 is a schematic view depicting a pose tracking system of the first embodiment.

A first embodiment of the present disclosure is a pose tracking system TS and a schematic view of which is depicted in FIG. 1. In the present embodiment, the pose tracking system TS comprises the head-mounted display 1 and the self-tracking device 2, and the head-mounted display 1 is communicatively connected to the self-tracking device 2.

In the present embodiment, the head-mounted display 1 at least comprises a display 11, an image capturing device 13 (i.e., referred to as the first image capturing device in some embodiments) and a processor 15. The processor 15 is electrically connected to the display 11 and the image capturing device 13.

It shall be appreciated that the head-mounted display 1 may be a VR/MR/AR head-mounted device, and the head-mounted display 1 can allow the user to see the hand and the self-tracking device through an optical see-through operation or a video see-through operation.

It shall be appreciated that the display 11 can be various devices with display functions. The image capturing device 13 may comprise a plurality of image capturing units (e.g., a plurality of depth camera lenses) to generate a plurality of real-time images corresponding to a field of view (FOV). The processor 15 may be any of various processors, Central Processing Units (CPUs), microprocessors, digital signal processors or other coordinate system offset calculating apparatuses known to those of ordinary skill in the art.

Figure 2:
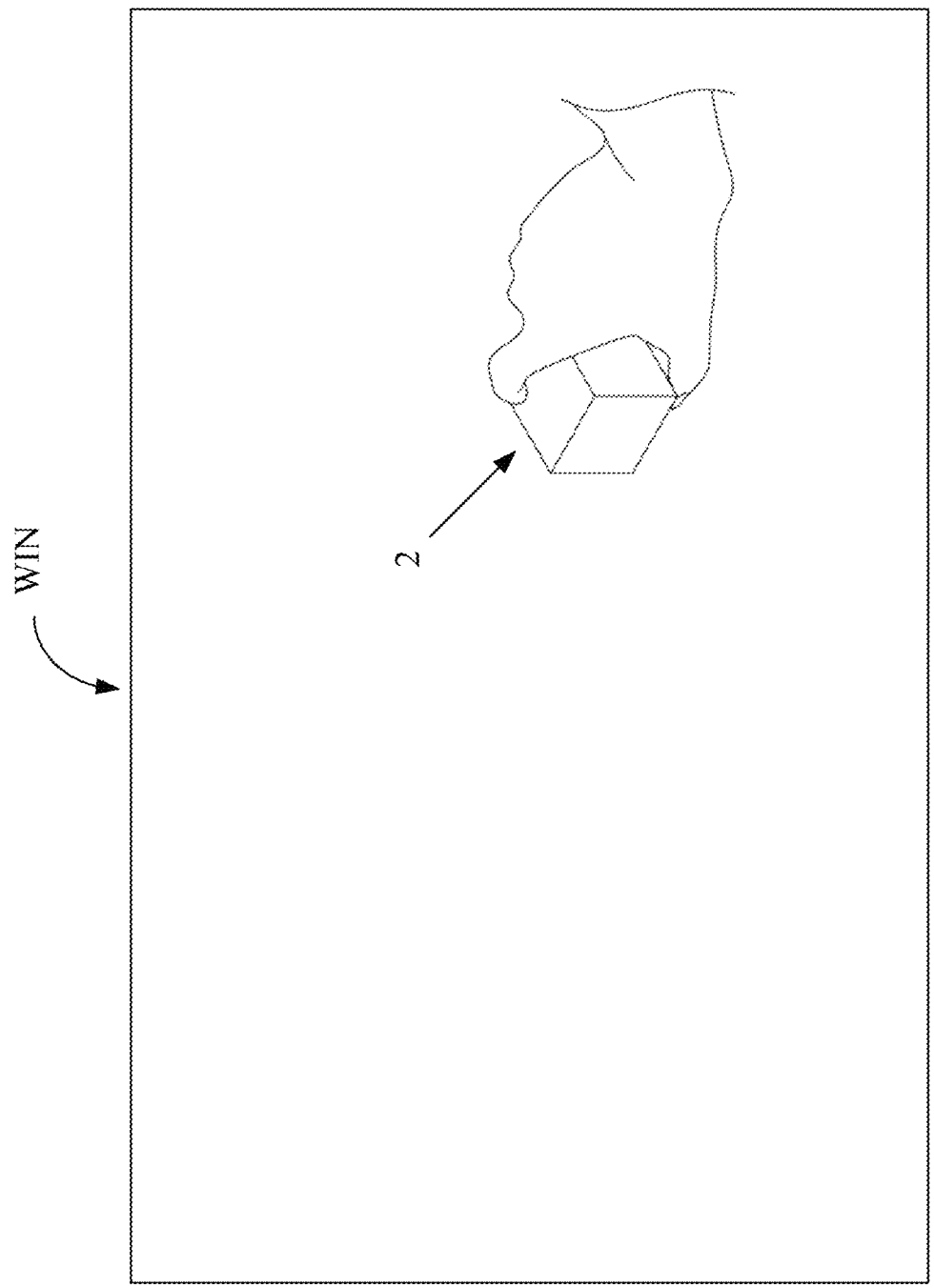
FIG. 2 is a schematic view depicting an image window of a display of some embodiments.

For example, as shown in FIG. 2, the display 11 of the head-mounted display 1 can be used to display an image window WIN, and the user can view the real-time image of the self-tracking device 2 held by the user through the image window WIN.

In some embodiments, as shown in FIG. 1, the self-tracking device 2 at least comprises an image capturing device 21 (i.e., referred to as the second image capturing device in some embodiments) and an inertial sensor 23. The image capturing device 21 may comprise a plurality of image capturing units for generating a plurality of corresponding real-time images to perform a self-positioning operation for inside-out tracking.

In some embodiments, the inertial sensor 23 may continuously generate a sequence of a plurality of inertial measurement parameters (for example, an inertial measurement parameter stream generated at a frequency of 10 times per second). It shall be appreciated that each of the inertial measurement parameters may include, for example, an acceleration, a rotation amount, and an angular acceleration.

It shall be appreciated that the self-tracking device 2 can regularly generate self-tracking pose information of the self-tracking device 2, and regularly transmit the self-tracking pose information to the head-mounted display 1 for interactive operation. In some embodiments, the self-tracking pose information comprises coordinate values and angle values corresponding to three coordinate axes in space. In some embodiments, the self-tracking pose information may further comprise auxiliary information such as speed values.

It shall be appreciated that both the head-mounted display 1 and the self-tracking device 2 need to establish their own map coordinate systems of simultaneous localization and mapping (SLAM) during operation. If there is an error (e.g., the locations of the origins are different) in the SLAM map coordinate systems of the head-mounted display 1 and the self-tracking device 2, the user experience may be poor. Therefore, the present disclosure may calibrate the self-tracking pose information generated by the self-tracking device 2 through the calibrating operation.

The specific content of the calibrating operation in the present disclosure will be described below. First, in the present embodiment, the image capturing device 13 of the head-mounted display 1 is configured to generate a plurality of real-time images (hereinafter referred to as: the first real-time images) including a user holding a self-tracking device 2 in a physical space.

Next, the head-mounted display 1 in the pose tracking system TS receives a self-tracking pose information (hereinafter referred to as: the first self-tracking pose information) from the self-tracking device 2. The head-mounted display 1 generates a hand pose information based on the first real-time images, and the hand pose information is a six-degree-of-freedom (DOF) information.

Specifically, the head-mounted display 1 may analyze the first real-time images to determine a plurality of hand joint positions of the user (for example: 26 joint positions of the hand). Then, the head-mounted display 1 generates the hand pose information based on the hand joint positions.

In some embodiments, when the self-tracking device 2 is a controller, the user can control the buttons on the controller with a single finger. Therefore, the head-mounted display 1 may generate the hand pose information by analyzing the hand joint positions of the single finger.

Next, the head-mounted display 1 calculates a drift information of the hand pose information and the first self-tracking pose information. Finally, the head-mounted display 1 calibrates the first self-tracking pose information based on the drift information.

It shall be appreciated that since the self-tracking device 2 can be held in the hand, the head-mounted display 1 may calculate the drift information through the hand pose information and the first self-tracking pose information.

It shall be appreciated that the head-mounted display 1 can calculate the direction in the hand pose information by identifying the two nodes (for example, the joint points of the thumb), and the head-mounted display 1 can calculate the angle from the self-tracking device 2 based on the direction. The head-mounted display 1 can calculate drift information through the hand pose information and the first self-tracking pose information, which both have position and angle information.

For example, the head-mounted display 1 can determine the hand joint position (for example: thumb) of the user's hand holding the self-tracking device 2 based on the hand pose information, and can calculate the position information and angle information of the self-tracking device 2 through the connection of at least two points. Then, the head-mounted display 1 compares the position information and angle information generated for the self-tracking device 2 based on the hand pose information with the position information and angle information included in the first self-tracking pose information itself to calculate the drift information between the two.

In some embodiments, the drift information comprises a rotation matrix and a displacement matrix.

Specifically, the operation of calculating the drift information of the hand pose information and the first self-tracking pose information by the head-mounted display 1 may further include the following operations. First, the head-mounted display 1 calculates a device pose information of the self-tracking device 2 in the physical space based on the hand pose information, and the device pose information comprises a position information and an angle information. Next, the head-mounted display 1 calculates the rotation matrix and the displacement matrix based on the first self-tracking pose information and the device pose information.

In some embodiments, in order to reduce the coordinate system error between devices, the head-mounted display 1 can actively transmit a calibration value to the self-tracking device 2 to calibrate the coordinate system of the self-tracking device 2. Specifically, the head-mounted display 1 transmits the drift information to the self-tracking device 2 to make the self-tracking device 2 calibrate a coordinate system of the self-tracking device 2 based on the drift information.

In some embodiments, the self-tracking device 2 may be unable to perform self-tracking operations based on computer vision (CV) due to human or environmental problems (for example, the image captured by the image capturing device is blocked). In such a situation, the self-tracking pose information generated by the self-tracking device 2 will return to the three-degree-of-freedom information mode (i.e., only rotation information, but no depth information such as translation).

In order to solve the aforementioned problem, the head-mounted display 1 can calibrate the self-tracking pose information through the information (for example, distance information) in the hand pose information. The specific content of the present disclosure on calibrating the self-tracking pose information will be described below.

In the present embodiment, the head-mounted display 1 in the pose tracking system TS receives a self-tracking pose information (hereinafter referred to as: the second self-tracking pose information) from the self-tracking device 2. Next, the head-mounted display 1 determines whether the second self-tracking pose information is a three-degree-of-freedom information.

Finally, the head-mounted display 1 in response to the second self-tracking pose information being the three-degree-of-freedom information, generating a new second self-tracking pose information based on the hand pose information and the second self-tracking pose information, and the new second self-tracking pose information is the six-degree-of-freedom information. For example, the head-mounted display 1 can generate new second self-tracking posture information based on the distance information in the hand pose information (e.g., positioning information about the self-tracking device 2) and the rotation information in the second self-tracking pose information.

In some embodiments, the head-mounted display 1 generates an image corresponding to the self-tracking device 2 for displaying on the display 11 based on the new second self-tracking pose information.

It shall be appreciated that when the self-tracking device 2 performs the operation of simultaneous localization and mapping, it usually needs to perform a map sharing operation with the head-mounted display 1 to achieve coordinate alignment with the head-mounted display 1. However, the operation speed of map sharing will be limited by the speed of wireless transmission, and may be affected by adverse environmental factors, making the speed unable to be stable every time. Therefore, it usually takes some time for the self-tracking device 2 to enter the six-degree-of-freedom mode.

In some embodiments, the self-tracking device 2 may need to perform a relocation operation due to certain events (e.g., reboot). After the relocation operation of the self-tracking device 2 is completed, the self-tracking device 2 may perform normal tracking mode through computer vision and generate complete self-tracking pose information (i.e., self-tracking pose information with six-degree-of-freedom) to the head-mounted display 1. However, when the self-tracking device 2 performs the relocation operation, since the self-tracking device 2 does not have complete self-tracking pose information of the self-tracking device 2, the display 11 in the head-mounted display 1 may not be able to correctly display the position and pose of the self-tracking device 2.

In some embodiments, the head-mounted display 1 transmits a map data to the self-tracking device 2 to make the self-tracking device 2 perform a relocation operation based on the map data and the second real-time images.

In some embodiments, since the self-tracking device 2 has not completed the relocation operation, the auxiliary positioning information provided by the self-tracking device 2 to the head-mounted display 1 is incomplete, and the head-mounted display 1 cannot display the position and pose of the self-tracking device 2 on the display 11. At this time, the head-mounted display 1 can actively combine part of the information (i.e., the self-tracking pose information and the hand pose information) to generate virtual pose information for displaying, so as to enhance the user experience.

Specifically, before the self-tracking device 2 completes the relocation operation, the head-mounted display 1 receives a self-tracking pose information from the self-tracking device 2 (e.g., referred to as the third self-tracking pose information in some embodiments), and the self-tracking pose information is the three-degree-of-freedom information.

Then, the head-mounted display 1 generates fusion pose information based on the self-tracking pose information and the hand pose information. For example, the processor 15 can use the hand pose information to supplement the missing position and translation information in the self-tracking pose information (i.e., only rotational dimensional data, but no translational depth information) to generate the fusion pose information.

Finally, the head-mounted display 1 generates a first image corresponding to the self-tracking device 2 for displaying on the display 11 based on the fusion pose information.

In some embodiments, the head-mounted display 1 can gradually and finely adjust the displayed image to the six-degree-of-freedom tracking pose information provided by the self-tracking device 2 after the relocation operation of the self-tracking device 2 is completed (i.e., tracking pose information with six-degree-of-freedom can be generated).

Specifically, after the self-tracking device 2 completes the relocation operation, the head-mounted display 1 receives a self-tracking pose information (e.g., referred to as the fourth self-tracking pose information in some embodiments) from the self-tracking device 2, and the self-tracking pose information is the six-degree-of-freedom information. Next, the head-mounted display 1 gradually adjusts the fusion pose information to the self-tracking pose information to generate the first image corresponding to the self-tracking device 2 for displaying on the display 11 (e.g., evenly distribute the difference between the two in each image frame to slowly adjust the displayed image).

Figure 3:
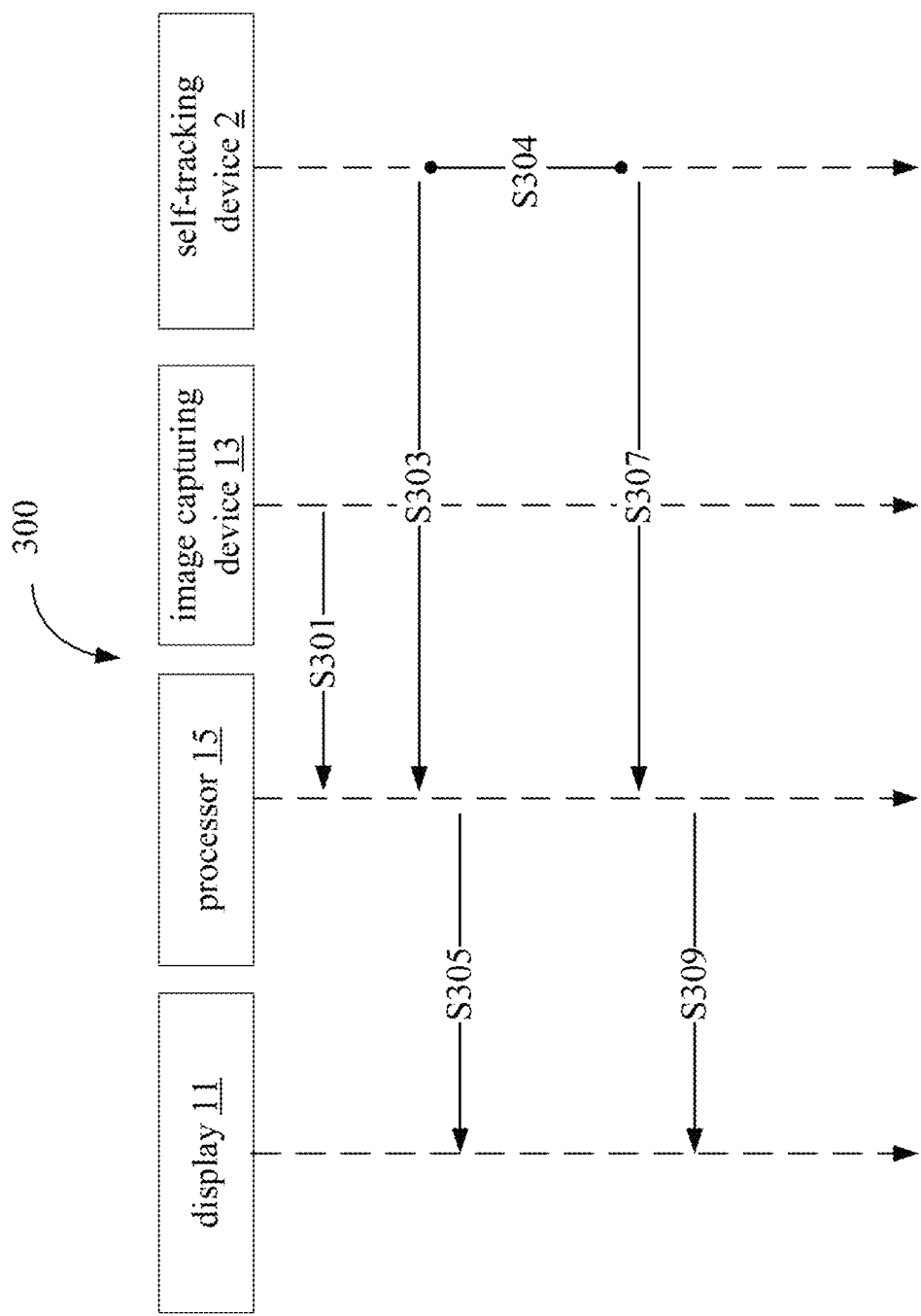
FIG. 3 is a schematic view depicting operations of some embodiments.

For ease of understanding, please refer to the operation flow chart 300 in FIG. 3. As shown in FIG. 3, the processor 15 executes operation S301 to generate hand pose information based on the real-time image generated by the image capturing device 13. Next, when the self-tracking device 2 performs the relocation operation of operation S304, the processor 15 performs operation S303 to receive self-tracking pose information from the self-tracking device 2 (i.e., the self-tracking pose information is the three-degree-of-freedom information).

Next, the processor 15 executes operation S305 to generate the fusion pose information based on the self-tracking pose information and the hand pose information, and transmits it to the display 11 for displaying.

Next, after the self-tracking device 2 completes the relocation operation of operation S304, the self-tracking device 2 has completed its positioning and can generate the complete self-tracking pose information. The processor 15 executes operation S307 to receive the self-tracking pose information from the self-tracking device 2 (i.e., the self-tracking pose information is the six-degree-of-freedom information). Finally, the processor 15 executes operation S309 to gradually adjust the fusion pose information to the self-tracking pose information, and transmits it to the display 11 for displaying.

According to the above descriptions, the pose tracking system TS provided by the present disclosure uses the head-mounted display 1 to calibrate the self-tracking pose information generated by the self-tracking device 2 by calculating the drift information of the hand pose information and the self-tracking pose information to improve the accuracy of interaction between devices. In addition, the pose tracking system TS provided by the present disclosure can actively generate new self-tracking pose information based on hand pose information and self-tracking pose information when the self-tracking pose information generated by the self-tracking device 2 is incomplete (e.g., the computer vision image of the self-tracking device 2 is blocked, and the self-tracking pose information is only the three-degree-of-freedom information), so as to improve the user's service experience. In addition, the pose tracking system TS provided by the present disclosure can also generate the fusion pose information through the self-tracking pose information and the hand pose information and display it on the display 11 before the self-tracking device 2 completes the relocation operation, thereby improving the user's service experience.

The second embodiment of the present disclosure is a head-mounted display, such as the head-mounted display 1 in the pose tracking system TS in the first embodiment.

In the present embodiment, the head-mounted display at least comprises a display, an image capturing device, and a processor, and the processor is electrically connected to the display and the image capturing device (e.g., the display 11, the image capturing device 13, and the processor 15 in the first embodiment).

In the present embodiment, the processor in the head-mounted display receives the self-tracking pose information from an external self-tracking device (for example, the self-tracking device 2 in the pose tracking system TS in the first embodiment).

Then, the processor can generate hand pose information based on the first real-time images, and the hand pose information is a six-degree-of-freedom information.

Subsequently, the processor calculates a drift information of the hand pose information and the self-tracking pose information. Finally, the processor calibrates the self-tracking pose information based on the drift information.

In addition, since the implementation of the display, the image capturing device and the processor in the present embodiment is similar to the display 11, the image capturing device 13, and the processor 15 in the head-mounted display 1, no further description is given.

In addition to the aforesaid steps, the second embodiment can also execute all the operations and steps of the head-mounted display 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

Figure 4:
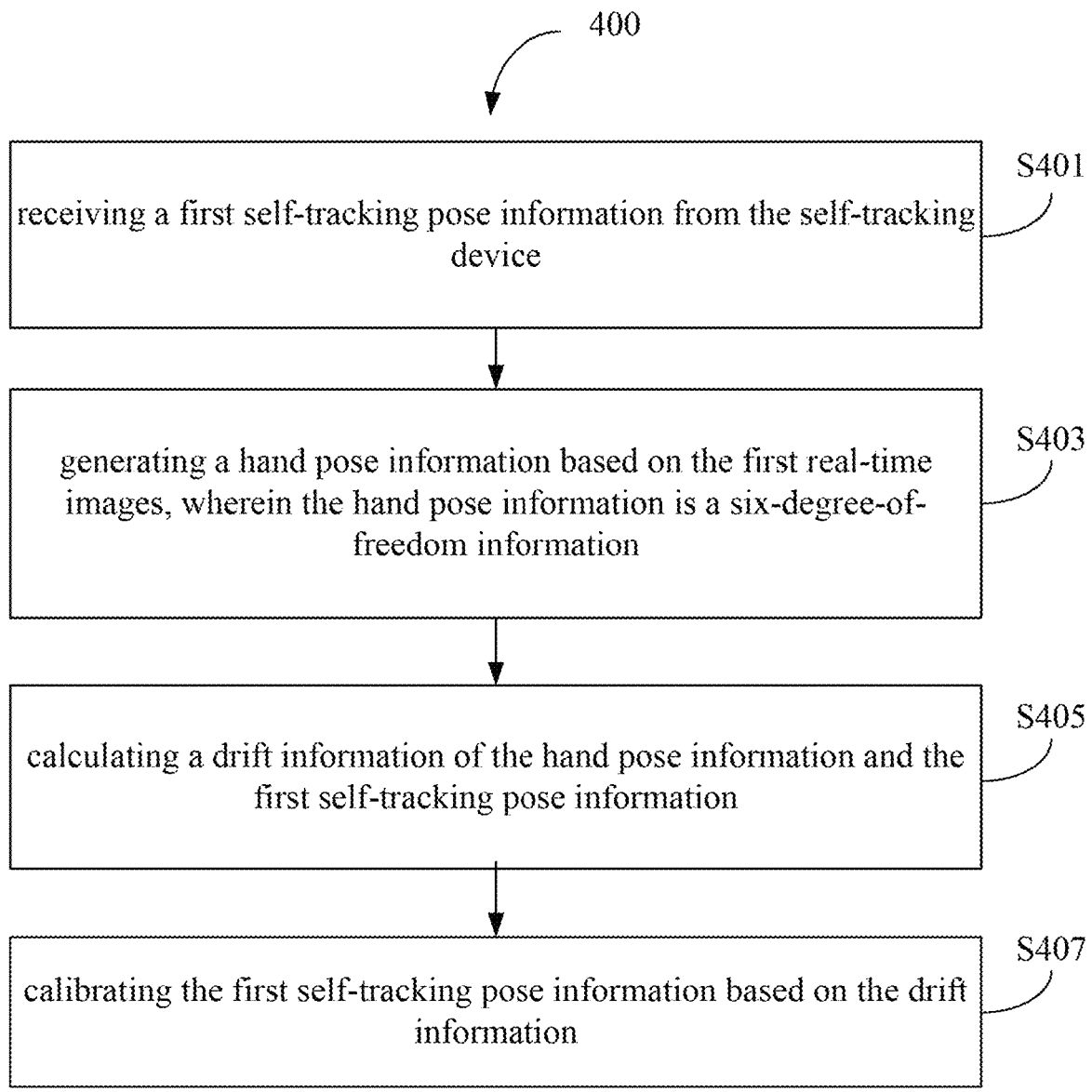
FIG. 4 is a partial flowchart depicting a pose tracking method of the second embodiment.

A third embodiment of the present disclosure is a pose tracking method and a flowchart thereof is depicted in FIG. 4. The pose tracking method 400 is adapted for an electronic apparatus (e.g., the head-mounted display 1 of the first embodiment). The electronic apparatus is configured to generate a plurality of first real-time images including a user holding a self-tracking device in a physical space. The pose tracking method 400 calibrates the self-tracking pose information through the steps S401 to S407.

In the step S401, the electronic apparatus receives a first self-tracking pose information from the self-tracking device. Next, in the step S403, the electronic apparatus generates a hand pose information based on the first real-time images, wherein the hand pose information is a six-degree-of-freedom information.

Next, in the step S405, the electronic apparatus calculates a drift information of the hand pose information and the first self-tracking pose information. Finally, in the step S407, the electronic apparatus calibrates the first self-tracking pose information based on the drift information.

In addition to the aforesaid steps, the third embodiment can also execute all the operations and steps of the pose tracking system TS set forth in the first embodiment, have the same functions, and deliver the same technical effects as the first embodiment. How the third embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the image capturing device, the real-time image, the self-tracking pose information, the image, etc.) are preceded by terms such as "first", "second", "third", or "fourth", and these terms of "first", "second", "third", or "fourth" are only used to distinguish these different words. For example, the "first" and "second" self-tracking pose information are only used to indicate the self-tracking pose information used in different operations.

According to the above descriptions, the pose tracking technology provided by the present disclosure (including at least head-mounted displays, systems and methods) calibrates the self-tracking pose information generated by the self-tracking device by calculating the drift information of the hand pose information and the self-tracking pose information to improve the accuracy of interaction between devices. In addition, the pose tracking technology provided by the present disclosure can actively generate new self-tracking pose information based on hand pose information and self-tracking pose information when the self-tracking pose information generated by the self-tracking device is incomplete (e.g., the computer vision image of the self-tracking device is blocked, and the self-tracking pose information is only the three-degree-of-freedom information), so as to improve the user's service experience. In addition, the pose tracking technology provided by the present disclosure can also generate the fusion pose information through the self-tracking pose information and the hand pose information and display it on the display before the self-tracking device completes the relocation operation, thereby improving the user's service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
    a display;
    a first image capturing device, being configured to generate a plurality of first real-time images including a self-tracking device in a physical space; and
    a processor, being electrically connected to the display and the first image capturing device, and being configured to perform operations comprising:
    receiving a first self-tracking pose information from the self-tracking device, wherein the first self-tracking pose information is calculated by the self-tracking device, and the first self-tracking pose information corresponds to a hand holding pose information of a user;
    generating a hand pose information based on the first real-time images, wherein the hand pose information is a six-degree-of-freedom information;
    calculating a drift information of the hand pose information and the first self-tracking pose information;
    calibrating the first self-tracking pose information based on the drift information; and
    transmitting the drift information to the self-tracking device to make the self-tracking device calibrate a coordinate system of the self-tracking device based on the drift information.

2. The head-mounted display of claim 1, wherein the processor is further configured to perform the following operations:
    receiving a second self-tracking pose information from the self-tracking device;
    determining whether the second self-tracking pose information is a three-degree-of-freedom information; and
    in response to the second self-tracking pose information being the three-degree-of-freedom information, generating a new second self-tracking pose information based on the hand pose information and the second self-tracking pose information, wherein the new second self-tracking pose information is the six-degree-of-freedom information.

3. The head-mounted display of claim 1, wherein the drift information comprises a rotation matrix and a displacement matrix.

4. The head-mounted display of claim 3, wherein the operation of calculating the drift information of the hand pose information and the first self-tracking pose information further comprises the following operations:
    calculating a device pose information of the self-tracking device in the physical space based on the hand pose information, wherein the device pose information comprises a position information and an angle information; and
    calculating the rotation matrix and the displacement matrix based on the first self-tracking pose information and the device pose information.

5. The head-mounted display of claim 1, wherein the operation of generating the hand pose information further comprises the following operations:
    analyzing the first real-time images to determine a plurality of hand joint positions of the user; and
    generating the hand pose information based on the hand joint positions.

6. The head-mounted display of claim 1, wherein the self-tracking device comprises a second capturing device for generating a plurality of second real-time images, and the processor further performs the following operations:
    transmitting a map data to the self-tracking device to make the self-tracking device perform a relocation operation based on the map data and the second real-time images.

7. The head-mounted display of claim 6, wherein the processor is further configured to perform the following operations:
    receiving a third self-tracking pose information from the self-tracking device before the self-tracking device completes the relocation operation, wherein the third self-tracking pose information is a three-degree-of-freedom information;
    generating a fusion pose information based on the third self-tracking pose information and the hand pose information; and generating a first image corresponding to the self-tracking device for displaying on the display based on the fusion pose information.

8. The head-mounted display of claim 7, wherein the processor is further configured to perform the following operations:
receiving a fourth self-tracking pose information from the self-tracking device after the self-tracking device completes the relocation operation, wherein the fourth self-tracking pose information is the six-degree-of-freedom information; and
gradually adjusting the fusion pose information to the fourth self-tracking pose information to generate the first image corresponding to the self-tracking device for displaying on the display.

9. The head-mounted display of claim 2, wherein the processor is further configured to perform the following operations:
generating a second image corresponding to the self-tracking device for displaying on the display based on the new second self-tracking pose information.

10. A pose tracking system, comprising:
a self-tracking device; and
a head-mounted display, being communicatively connected to the self-tracking device, wherein the head-mounted display is configured to generate a plurality of first real-time images including the self-tracking device in a physical space;
wherein the pose tracking system is configured to perform the following operations:
receiving, by the head-mounted display, a first self-tracking pose information from the self-tracking device, wherein the first self-tracking pose information is calculated by the self-tracking device, and the first self-tracking pose information corresponds to a hand holding pose information of a user;
generating, by the head-mounted display, a hand pose information based on the first real-time images, wherein the hand pose information is a six-degree-of-freedom information;
calculating, by the head-mounted display, a drift information of the hand pose information and the first self-tracking pose information;
calibrating, by the head-mounted display, the first self-tracking pose information based on the drift information; and
transmitting, by the head-mounted display, the drift information to the self-tracking device to make the self-tracking device calibrate a coordinate system of the self-tracking device based on the drift information.

11. The pose tracking system of claim 10, wherein the head-mounted display is further configured to perform the following operations:
receiving a second self-tracking pose information from the self-tracking device;
determining whether the second self-tracking pose information is a three-degree-of-freedom information; and
in response to the second self-tracking pose information being the three-degree-of-freedom information, generating a new second self-tracking pose information based on the hand pose information and the second self-tracking pose information, wherein the new second self-tracking pose information is the six-degree-of-freedom information.

12. The pose tracking system of claim 10, wherein the drift information comprises a rotation matrix and a displacement matrix.

13. The pose tracking system of claim 12, wherein the operation of calculating the drift information of the hand pose information and the first self-tracking pose information by the head-mounted display further comprises the following operations:
calculating a device pose information of the self-tracking device in the physical space based on the hand pose information, wherein the device pose information comprises a position information and an angle information; and
calculating the rotation matrix and the displacement matrix based on the first self-tracking pose information and the device pose information.

14. The pose tracking system of claim 10, wherein the operation of generating the hand pose information by the head-mounted display further comprises the following operations:
analyzing the first real-time images to determine a plurality of hand joint positions of the user; and
generating the hand pose information based on the hand joint positions.

15. The pose tracking system of claim 10, wherein the self-tracking device is further configured to generate a plurality of second real-time images, and the head-mounted display is further configured to perform the following operations:
transmitting a map data to the self-tracking device to make the self-tracking device perform a relocation operation based on the map data and the second real-time images.

16. The pose tracking system of claim 15, wherein the head-mounted display is further configured to perform the following operations:
receiving a third self-tracking pose information from the self-tracking device before the self-tracking device completes the relocation operation, wherein the third self-tracking pose information is a three-degree-of-freedom information;
generating a fusion pose information based on the third self-tracking pose information and the hand pose information; and
generating a first image corresponding to the self-tracking device for displaying on the display based on the fusion pose information.

17. The pose tracking system of claim 16, wherein the head-mounted display is further configured to perform the following operations:
receiving a fourth self-tracking pose information from the self-tracking device after the self-tracking device completes the relocation operation, wherein the fourth self-tracking pose information is the six-degree-of-freedom information; and
gradually adjusting the fusion pose information to the fourth self-tracking pose information to generate the first image corresponding to the self-tracking device for displaying on the display.

18. A pose tracking method, being adapted for use in an electronic apparatus, wherein the electronic apparatus is configured to generate a plurality of first real-time images including a self-tracking device in a physical space, and the pose tracking method comprises the following steps:
receiving a first self-tracking pose information from the self-tracking device, wherein the first self-tracking pose information is calculated by the self-tracking device, and the first self-tracking pose information corresponds to a hand holding pose information of a user;

generating a hand pose information based on the first real-time images, wherein the hand pose information is a six-degree-of-freedom information;

calculating a drift information of the hand pose information and the first self-tracking pose information;

calibrating the first self-tracking pose information based on the drift information; and transmitting the drift information to the self-tracking device to make the self-tracking device calibrate a coordinate system of the self-tracking device based on the drift information.

\* \* \* \* \*